United States Patent [19]

Kato et al.

[11] Patent Number: 5,247,583

[45] Date of Patent: Sep. 21, 1993

[54] IMAGE SEGMENTATION METHOD AND APPARATUS THEREFOR

[75] Inventors: Makoto Kato; Shinichiro Miyaoka; Makoto Nohmi, all of Kawasaki; Hiroyuki Okawara, Suginami; Toyohisa Morita, Kawasaki, all of Japan

[73] Assignee: Hitachi, Ltd., Tokyo, Japan

[21] Appl. No.: 606,629

[22] Filed: Oct. 31, 1990

[30] Foreign Application Priority Data

Nov. 1, 1989 [JP] Japan .................................. 1-286168
Jun. 27, 1990 [JP] Japan .................................. 2-166573

[51] Int. Cl.⁵ .............................................. G06K 9/34
[52] U.S. Cl. ........................................ 382/9; 382/17; 364/526
[58] Field of Search ............... 382/9, 17, 36; 340/701, 340/703, 729, 706, 709; 358/22 CK, 75, 76, 903; 364/526, 709.11; 250/226; 395/131

[56] References Cited

U.S. PATENT DOCUMENTS

| | | |
|---|---|---|
| 3,745,527 | 7/1973 | Yoshimura et al. ................. 382/17 |
| 4,653,014 | 3/1987 | Mikami et al. ..................... 364/525 |
| 4,718,089 | 1/1988 | Hayashi et al. .................... 382/17 |
| 4,727,498 | 2/1988 | Ehrlich et al. ...................... 364/525 |
| 4,731,663 | 3/1988 | Kovalchick et al. ................ 382/17 |
| 4,839,838 | 6/1989 | Labiche et al. .................... 340/709 |

OTHER PUBLICATIONS

"Computer Vision", Prentice-Hall, Inc. Chapter 4 Boundary Detection, K. H. Ballard, C. B. Brown, 1982. Proceedings of First International Conference on Computer Vision, 1987, IEEE Computer Society Press, pp. 259-268.
Science, vol. 194, 1976, p. 283 "Cooperative of Stereo Disparity", D. Marr, T. Poggio.

Primary Examiner—David K. Moore
Assistant Examiner—David Fox
Attorney, Agent, or Firm—Fay, Sharpe, Beall, Fagan, Minnich & McKee

[57] ABSTRACT

An image processing area is divided into a plurality of small areas which are allowed to overlap one another. One or a plurality of pixels in a region to be segmented and in a region not to be segmented are specified. A representative point of the region to be segmented and a reference point of the region not to be segmented are determined from the color information of each of the pixels. A discriminating plane, a plane or a curved surface that intersects the line segment connecting the representative point and the reference point a right angles is used in processing. By the processing a particular region can be segmented out of the image. Further, a shape model is made by two-dimensionally projecting from a given direction the three-dimensional structure expressed by a line drawing consisting of nodes and curves connecting the nodes based on priori property relating the structure of the region to be segmented in the image. The shape model is then roughly correlated in position with the nodes on the contour of the image. An image processing provides stripe images having widths for each of the curves that is recomposed and used to find the contour and structure of the object in detail.

7 Claims, 20 Drawing Sheets

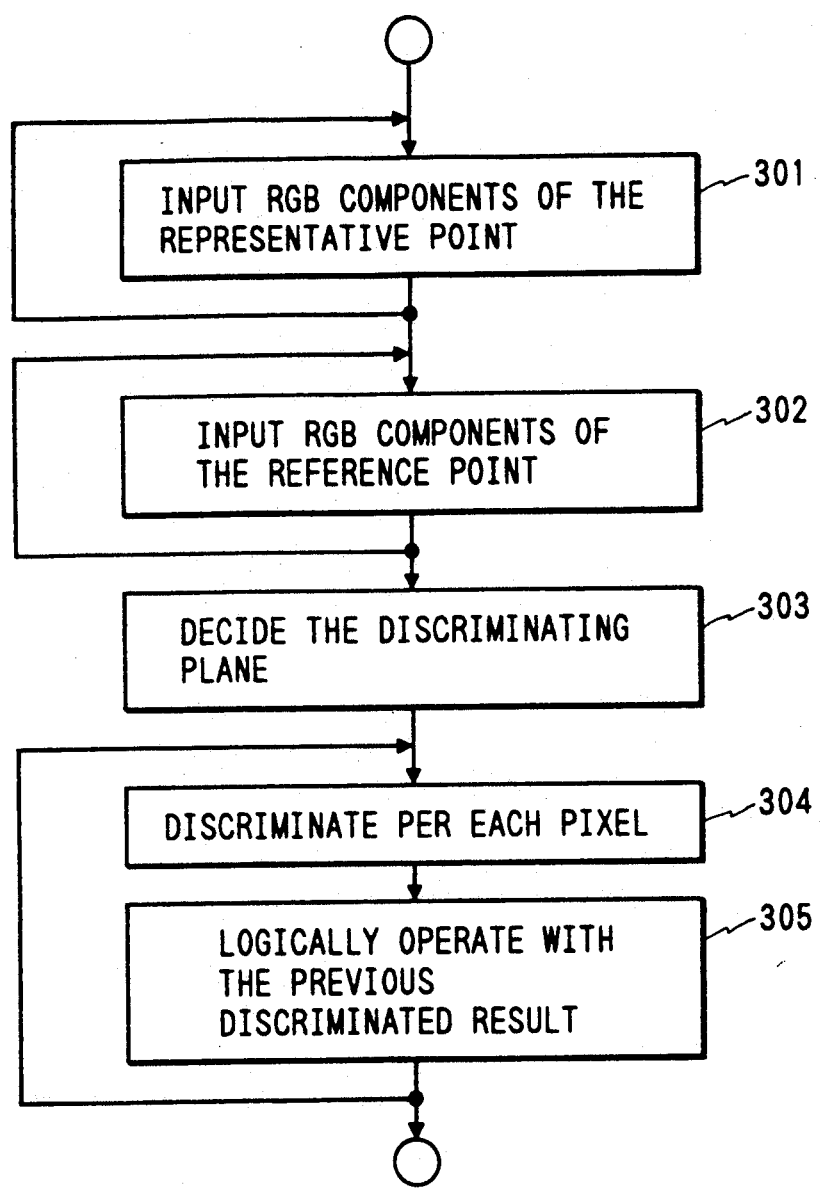

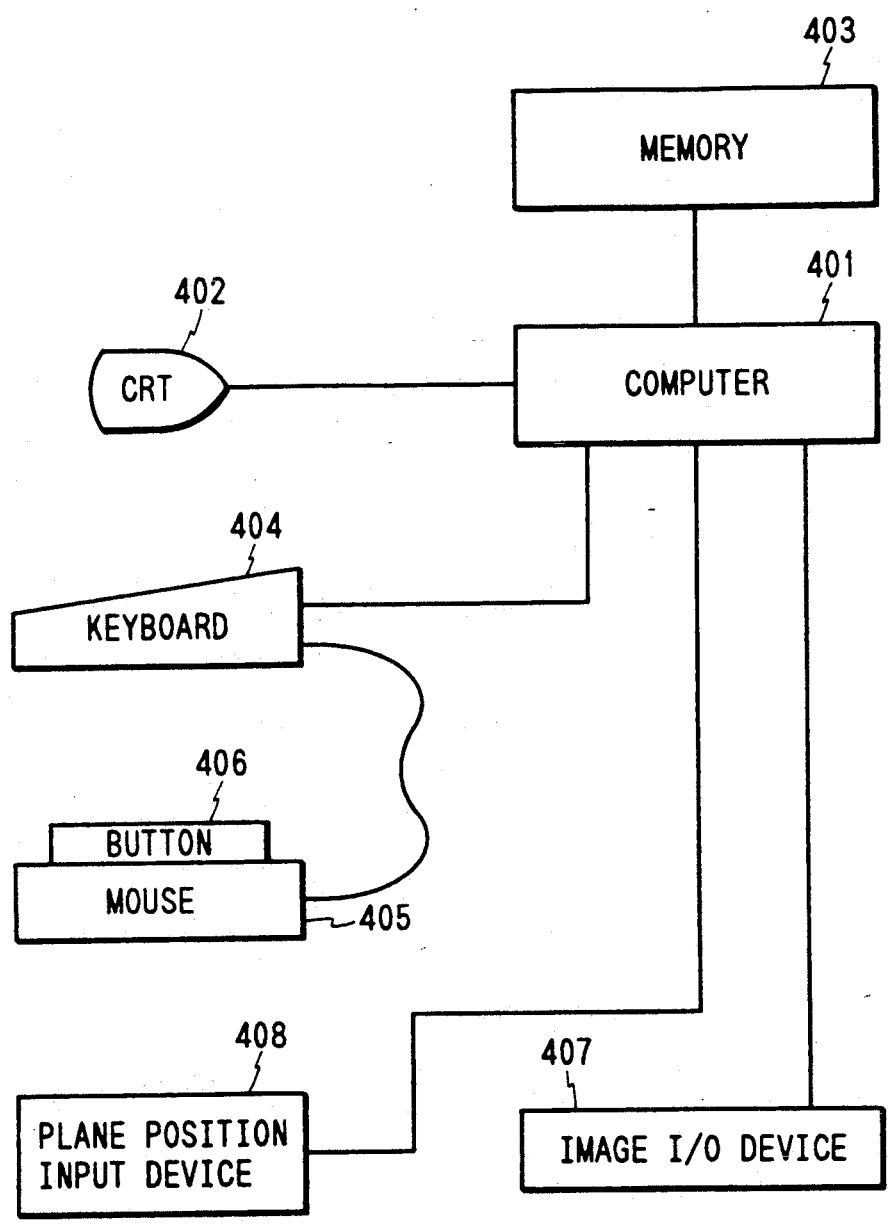

FIG. 12
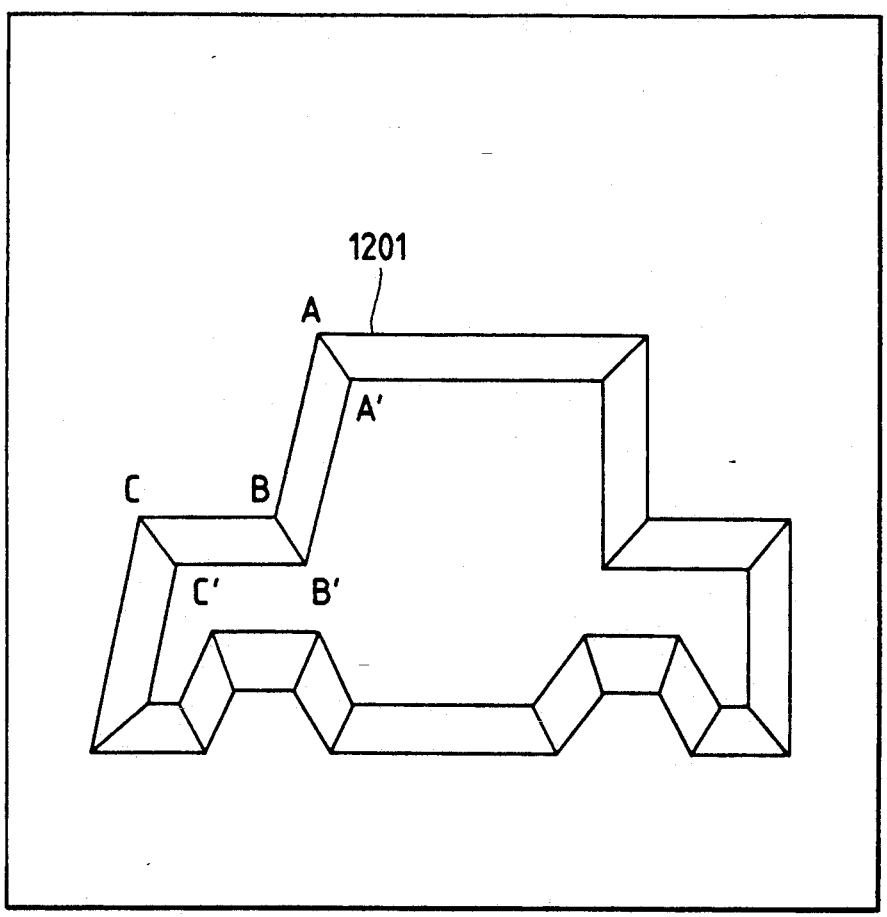
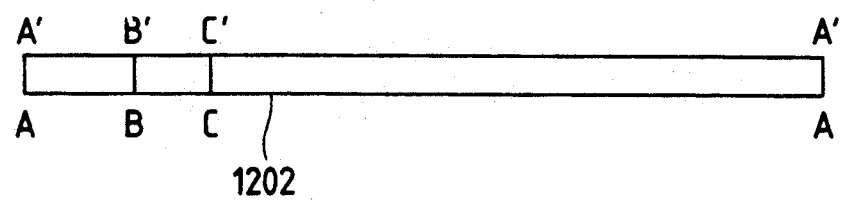

INITIAL VALUES OF THE EDGE

AFTER 1ST REPETITION

AFTER 2ND REPETITION

IMAGE SEGMENTATION METHOD AND APPARATUS THEREFOR

BACKGROUND OF THE INVENTION

1. Field of the Invention

The present invention relates to an image segmentation method of segmenting a particular portion out of an image necessary for simulating a design, and to an apparatus therefor.

2. Description of the Prior Art

Systems using abundant expressions of images have been vigorously studied and developed, such as presentation systems in shops. In order to more effectively utilize image information, image simulations such as synthesis of background, change of object colors, and the like have been extensively employed for simulation of designs of household electric appliances.

In order to carry out image simulation, it is necessary to segment a particular object out of an image. This is called an image segmentation technology. For instance, separation of only the portion of a car from an image including the car and taken on a street is an image segmentation technology, and insertion of this portion in a scenery of the country is an image simulation.

The image segmentation technology can be roughly divided into two. The first method uses color information, as is described in, for example, "Full Color Image Processor SHAIP and Its Applications", O plus E, January, 1989, pp. 131-142. When, for example, a red car is to be separated from the background according to this method, it is judged whether the color of each pixel in the image is in a certain range of red color, and it is discriminated, depending upon the result of this judgement, whether it is an object to be segmented. Concretely speaking, when a pixel of the i-th row and j-th column has a color of R, G and B components $r(i, j)$, $g(i, j)$, $b(i, j)$, and when these components have minimum and maximum threshold values $\Sigma rmin$, $\Sigma rmax$, $\Sigma gmin$, $\Sigma gmax$, $\Sigma bmin$, and $\Sigma bmax$, the following range is segmented, i.e., $$\Sigma rmin < r(i, j) < \Sigma rmax$$

and $$\Sigma gmin < g(i, j) < \Sigma gmax$$

and $$\Sigma bmin < b(i, j) < \Sigma bmax$$

This is the most general segmentation method which uses color information and has been employed by many companies as represented by the SHAIP mentioned above.

The discrimination processing is to judge whether or not conditions for discrimination (condition (2) in this case) are satisfied by the pixels in some region or of the whole image. The region (mask) consisting of a set of pixels that are judged to satisfy the above conditions should, most desirably, be in agreement with the region that is to be separated from other regions in the image, but are not necessarily in agreement therewith due to the ability of the discrimination processing.

In order to decide Rmin, etc. in this processing, histograms are often prepared for each of red, green and blue colors and are displayed.

The histograms show the distributions of values of red, green and blue colors of pixels in the whole image or in some regions, and show the values related to red, green and blue components and information related to the numbers of pixels having such values. In the above-mentioned example of a red car, a red mailbox that happens to exist in the background is also segmented. Therefore, the processing range must be limited to a real space (i-j space).

There is a special technology, chromakey method, in the technologies. The chromakey method has a feature that an object to be segmented such as a person is disposed in front of a background board of a predetermined color (such as green), and an image is photographed. When the portions other than the above-mentioned predetermined color is the objects to be segmented, the object is desirably segmented.

The second method uses edge information of the image, i.e., uses information of portions where values (color, brightness, etc.) of pixels in the image change. These methods have been studied in order to comprehend and recognize scenes in an image, and are described in "Computer Vision", Prentice-Hall, Inc., Chapter 4 Boundary Detection, K. H. Ballard, C. B. Brown, 1982. Basically, portions having large differences in the color or density among the neighboring pixels in an image are found as edges and are then connected to find its contour. The steps of finding edges are described below.

In the case of a monochromatic density image, the i, j image is expressed as $a(i, j)$. The i-direction represents a lateral direction and the j-direction represents a longitudinal direction.

(1) Differentiation of first order.
  Lateral direction: $a(i+1, j) - a(i, j)$,
  Longitudinal direction: $a(i, j+1) - a(i, j)$, $$\sqrt{(a(i+1, j) - a(i, j))^2 + (a(i, j+1) - a(i, j))^2}$$

etc.

(2) Differentiation of second order.
  Lateral direction: $a(i+1, j) - 2a(i, j) + a(i-1, j)$,
  Longitudinal direction: $a(i, j+1) - 2a(i, j) + a(i, j-1)$,
  Both directions: $a(i+1, j) + a(i-1, j) + a(i, j+1) + a(i, j-1) - 4a(i, j)$
etc.

(3) Zero crossing.

A point at which the differentiation of second order changes from positive to negative or from negative to positive. When information of intensity is used instead of that of position, the degree of change (corresponds to the differentiation of third order) is used.

The above two methods deal chiefly with a full-color image having 16.7 million colors per pixel and a monochromatic density image having 256 tones per image. Other various processings can be effected for simple images such as a binary image having two tones per pixel. For example, when a black object exists on a white background without overlapping other image patterns, boundaries of an object to be segmented are specified, and the specified boundaries are traced in order to segment the object.

Furthermore, there is another method of directly inputting coordinates of the contour of an object using an external input device such as a mouse instead of segmenting the image by the aforementioned image processing technology. That is, the cursor on the screen is located in synchronism with the operation and position of the mouse, and the cursor is caused to run along the contour of the object to be segmented, thereby to use the locus thereof as the contour.

As a recent study concerning the second method, furthermore, a system called SNAKE which uses a dynamic model is described in the Proceedings of First International Conference on Computer Vision, 1987, IEEE Computer Society Press, pp. 259-268.

Among the aforementioned conventional technologies, however, the first method that uses color information is effective when the distribution of object regions to be segmented is isolated, has a rectangular parallelopiped shape, and can be favorably discriminated. However, it is difficult to adapt a single reference of discrimination to the whole image where the color tone changes delicately depending upon the regions.

Even when separate histograms are used for red, green and blue colors, furthermore, the color distribution in the image is not fully grasped, and threshold values for discrimination are not properly set, making it difficult to favorably segment the image.

Among the aforementioned conventional technologies, furthermore, the first method which uses color information cannot be adapted except in the case where the object to be segmented has a uniform color and a color distribution which is different from other regions.

According to the second method which uses edge information among the aforementioned conventional technologies, a number of edges appear because of noises in the image, in addition to the edges of the object. Moreover, edges often disappear even in positions where a contour of the object should be formed. Therefore, it is difficult to selectively connect only the edges of the object. Many of these technologies hold only in limited environments such as in lines of factories, or require a tremendously long period of time.

Furthermore, it is difficult to apply the method of the binary image mentioned in the third place to images except for the binary images and multi-value images having small numbers of tones.

The last-mentioned method of directly specifying contour positions through an external input device has a problem that laborious work is required for correctly specifying the contour positions.

SUMMARY OF THE INVENTION

A first object of the present invention is to provide an image segmentation method which is capable of segmenting particular portions from an image even when the image has a complex distribution of colors or has a color distribution that changes delicately depending upon the portions, and to provide an apparatus therefor.

A second object of the present invention is to provide an image segmentation method which can be adapted to full-color images containing objects of different colors and monochromatic density images, and which requires reduced processing time and reduced amounts of work.

In order to achieve these objects, the present invention deals with an image segmentation method of segmenting particular objects out of an image and an apparatus therefor in an image processing apparatus that processes a digitally expressed color image or monochromatic density image, the method comprising the steps of:

inputting information containing at least one parameter of either the position or the attribute of image of a portion to be segmented and of a portion not to be segmented;

discriminating pixels pertaining to the portion to be segmented for at least one parameter in the information based on the property of said portion to be segmented and said portion not to be segmented relying on said inputted information;

finding a boundary of said portion to be segmented based on a coupling relationship of pixels at least in one small region that includes said discriminated pixels; and segmenting said portion to be segmented that is defined by said boundary.

Concretely speaking, furthermore, in order to achieve the above-mentioned first object of the present invention, the image processing region is divided into a plurality of small areas that are permitted to overlap, one or a plurality of pixels are specified in a portion to be segmented and in a portion not to be segmented for each of the small areas, a representative point in said portion to be segmented and a representative point (reference point) in said portion not to be segmented are determined from the color information of the pixels, and a plane or a curved surface that intersects a line segment connecting said representative point and said reference point at right angles is discriminated as a discriminating plane.

As for the overlapped portions among the above small areas, a logical operation is carried out to unify or eliminate these areas in order to form the portion that is to be segmented.

The discriminating plane is the one where the line segment is internally divided at a ratio of t to $1-t$, where t is selected to be a value where the discriminating plane is located in a position corresponding to a minimum portion in the histogram.

When there exist a plurality of representative points and reference points, the discrimination processing is carried out by finding a logical product of the discriminated results by the plurality of reference points with respect to a given representative point and by finding the logical sum of the results of the logical multiplication for each of the representative points.

It is also allowable to provide a plane position inputting device that directly inputs the position of a plane. This device is constituted by a pulse transmitter provided on the plane and a plurality of receivers for receiving pulses transmitted by the transmitter, and measures the time from a transmitter to the reception in order to measure the position of the plane.

In order to achieve the above-mentioned second object, it is possible to use a deformable and alterable shape model obtained by two-dimensionally projecting in an arbitrary direction a three-dimensional structure which is expressed by a line drawing consisting of nodes and curves connecting the nodes based, on apriori character of the structure of the object to be segmented present in an image. The shape model and the nodes on the contour of the object in the image are roughly correlated in regard to their positions, the image is cut into stripe images having a given width for each of the curves and is recomposed. Therefore, the image is processed based on the edge information of the recomposed image in order to find the contour and the structure of the object in detail.

When there is no shape model, the position coordinates near the contour of the object to be segmented in the image are inputted by the inputting device, stripe image areas having a given width are extracted along the line of points and are recomposed into a rectangular image, and the image is processed based on the edge data on the recomposed image in order to find the contour and the structure of the object in detail.

Next, operation of the present invention based on the structure will be described briefly.

With respect to achieving the aforementioned first object, an image is inputted and is displayed to specify the areas to be processed, and then the areas to be processed are discriminated. The discrimination processing consists of picking up a portion to be segmented as a mask on the screen to input R, G and B components of a representative point, picking up undesired portions which is not the mask to input R, G and B components of a reference point, and discriminating a plane that intersects at right angles the segment that connects these two points as a discriminating plane.

The segmentation result is displayed, and the branching processing is effected as to whether the segmented result is to be stored or not. When it is not to be stored, the mask is returned back to the state before the discrimination processing is carried out and this state is displayed. When the segmented result is to be stored, the processing is carried out to store the result.

With respect to achieving the aforementioned second object, the shape model roughly correlated to the object in the image and the line of points inputted by the inputting device exists nearly along the contour of the object that is to be segmented. The stripe images recomposed have a following striking feature compared with the original image. Assuming that the direction along the contour is the lateral direction and the direction perpendicular thereto is the longitudinal direction in the recomposed image, (1) only one point on each vertical line is on the contour, and (2) and the points of the contour on the neighboring vertical lines are close to each other. That is, in the recomposed stripe image, the feature resides in that the contour runs nearly in the lateral direction. This feature serves as an effective restrictive condition when the contour is to be determined from the edge information. By utilizing this, the following method can be made possible.

A method of achieving the aforementioned second object is to use a cooperative algorithm or what is called a Hopfield network which is a method of a neural network. The former has been well known as discussed by D. Marr, T. Poggio in Science, Vol. 194, 1976, p. 283 "Cooperative of Stereo Disparity" in connection with adaption to the stereo processing. The latter is explained in Neural Network Data Processing, Sangyo Tosho, 1988, pp. 20–27. It is now assumed that $C(i, j; t)$ is a value of a pixel of the i-th row and j-th column of the stripe image at a time t. For simplification, it is further assumed that $C(i, j; t)$ is a value of either 1 to 0 and an edge map image from which edge components are extracted by differentiation, etc., is in the initial state, i.e., $C(i, j; 0)$. For the purpose of simplicity, it is assumed that the edge map is a value of only 0 or 1. The value of a pixel having an edge is 1 and the value of a pixel without an edge is 0. The following recursive calculation is carried out concerning this $C(i, j; t)$, i.e., $$C(i, j; t+1) = \sigma[A(i, j; t) - \epsilon B(i, j; t) + \delta C(i, j; 0)]$$

where $\sigma[\ ]$ is the following step function at a threshold value $\sigma th$, $$\sigma[x] = 0, x < \sigma th$$

$$\sigma[x] = 1, x \geq \sigma th$$

Moreover, $$A(i, j; t) = C(i - 2, j; t) + C(i - 1, j; t) +$$

$$C(i + 1, j; t) + C(i + 2, j; t) B(i, j; t) = \sum_{\text{sum of } j} c(i, j; t)$$

The term $A(i, j : t)$ represents an emphasis (contours are close to each other among the neighboring vertical lines) in the lateral direction, and $B(i, j : t)$ represents a suppression (contour has one point on each longitudinal line) in the longitudinal direction. The term $C(i, j; 0)$ shows that a portion having an edge in the initial state is likely to form the contour. FIGS. 16(a), 16(b) and 16(c) show the simulated results of test data by the above method. Edges due to noises and missing portions of the contour that have existed in the initial state are eliminated through the repetition of calculation and a complete contour is formed. Though $C(i, j; 0)$ is treated as binary values for the purpose of simplicity, it is also possible to treat general continuous real values too. In this case, $\sigma[x]$ is not a step function but is a Sigmoid function.

Another method for achieving the aforementioned second object is the one that is called simulated annealing or Monte Carlo simulation. This method is also described in the name of Gibbs Sampler in the above-mentioned Neural Network Data Processing, Sangyo Tosho, 1988, pp. 31–33. This algorithm is based on an idea similar to a model (physical adsorption system of solid surfaces) in the physics on properties of matters. It is now assumed that a chain of mass points (correspond to adsorbed atoms) linked one-dimensionally together by springs is laid on the surface of a solid body (FIG. 17). The surface of the solid body corresponds to the initial condition of an edge, and an edged position is recessed. Therefore, a mass point on the edge gains a potential energy. It is assumed that each mass point is allowed to move only in the longitudinal direction but is not allowed to move in the lateral direction (the contour has one point on each vertical line). The mass points are linked together via springs, and gain elastic energies when they are in line laterally and lose parts of their energies when they are separated in the vertical direction (the contours come close to each other on the neighboring vertical lines). This determines the whole energy of the system. When this system is simulated at a finite temperature, the chain moves due to the heat energy, and the energy of arrangement (sum of potential energy and elastic energy) is in a high state. As the temperature is gradually lowered, the mass points fall on such places where the energies of arrangement become the smallests. The simulation is carried out according to the ordinary Monte Carlo method. First, described below is the basic operation of the Monte Carlo method at a temperature T.

(1) Generate a uniform random number and determine a mass point that is to be moved.

(2) Generate a uniform random number and determine how to move the mass point determined in (1) above.

In this simulation, the mass point is moved upwards by one or downwards by one.

(3) Calculate the amount of change $\Delta E$ in the energy of arrangement.

(4) When ΔE is negative, the trial of (2) is continued unconditionally. When ΔE is 0, the trial (2) is returned to the beginning. When ΔE is positive, a uniform random number is generated to compare the magnitude of the random number with that of exp($-\Delta E/T$). When the uniform random number is greater, the trial of (2) is returned to the beginning. When it is not, the trial is preserved.

The procedure in which the above operation is repeated by a number of times equal to the number of mass points is called one Monte Carlo step. Next, the procedure of simulation will be described.

(1) Place the chain on the initial arrangement. For instance, place the chain laterally straight at the center.

(2) Move the chain for a while at a high temperature (at a temperature sufficiently higher than a typical ΔE).

(3) Lower the temperature gradually.

It is further possible to carry out a variety of algorithms using the features of the aforementioned stripe image.

As described above, an effective restrictive condition is imparted by adding the processing of a small amount of work of inputting rough positions of the contours and by recomposing the image to form a stripe image, and it is made possible to extract the contour from the distribution of edges, the extraction having been so far difficult to carry out.

The foregoing and other objects, advantages, manner of operation and novel features of the present invention will be understood from the following detailed description when read in connection with the accompanying drawings.

BRIEF DESCRIPTION OF THE DRAWINGS

FIGS. 1 to 3 are flow charts illustrating the procedures of processings of an embodiment according to the present invention;

FIG. 4 is a diagram illustrating the configuration of hardwares of the embodiment according to the present invention;

FIGS. 11 to 17 are diagrams for explaining the content of processing of the second embodiment;

FIGS. 19, 20(a), 20(b) and 20(c) are diagrams illustrating the content of the processing of the third embodiment.

DETAILED DESCRIPTION OF THE PREFERRED EMBODIMENTS

Figure 1:
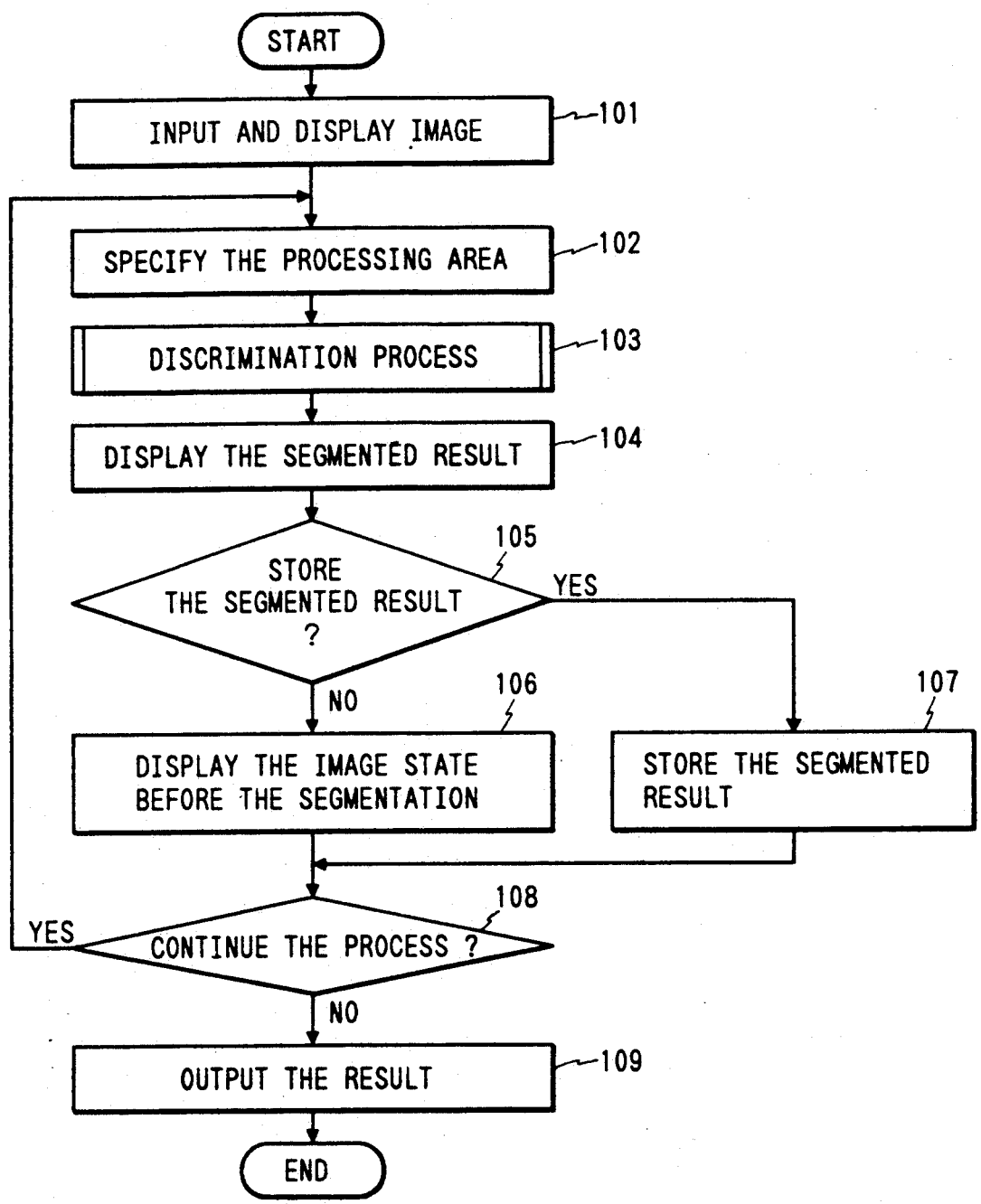

The invention will now be described by way of three embodiments. The first embodiment is chiefly concerned with means for achieving the first object of the present invention.

FIG. 4 is a diagram illustrating the hardware configuration of an embodiment according to the present invention, which comprises a computer 401, a memory 403 for storing digitized image, a CRT 402 that displays a color image or characters, an image input/output device 407 which inputs a photograph as a digital image and prints the image, a keyboard 404, a mouse 405, and a plane position input device 408 that will be described later with reference to FIG. 9.

Here, the function of the mouse 405 will be described. A small arrow is displayed on the CRT 402 according to a plane position designated by the mouse 405 in compliance with a control program in the computer 401. By moving the mouse 405, the operator is allowed to arbitrarily move the arrow on the screen of the CRT 402. If a button 406 on the mouse 405 is depressed, furthermore, the position information of the head of the arrow on the screen of the CRT 402 is sent to the computer 401, whereby it can be used by the software that operates therein.

Hereinafter, this operation is expressed by a word "picking (or clicking)" a place in the image.

As for the quality of image displayed on the CRT 402, furthermore, it is now generally known that the screen can display an image of 1000×1000, i.e., about a million pixels, and red, green and blue colors of 256 tones, respectively, or about 16,700,000 ($256^3$) colors in total. Therefore, the present invention maintains at least the image quality of this level but is in no way limited to this level only. The image input/output device 407 has performance that is capable of coping with this level.

Figure 2:
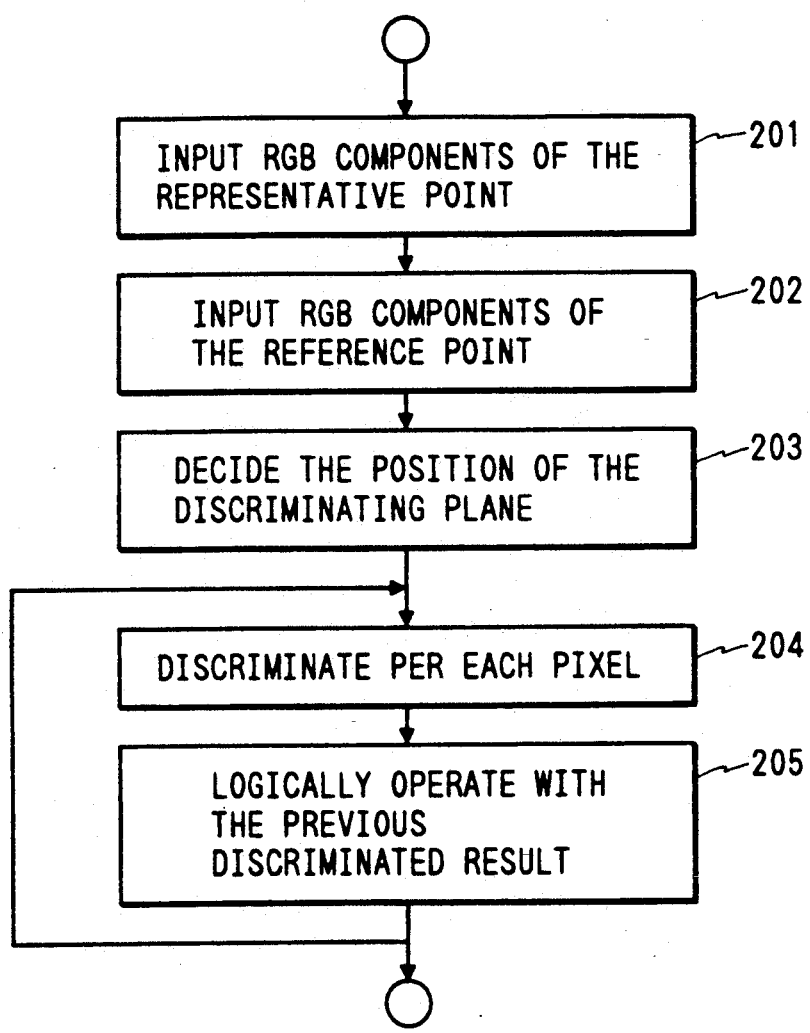

FIGS. 1 to 3 are flow charts explaining the procedure of processing an embodiment according to the present invention.

Describing the basic procedure of processing according to the present invention with reference to FIG. 1, in step 101, an image is inputted and displayed. In step 102, a processing area is specified, and in step 103, the processing area is discriminated. This processing will be described later.

In step 104, the segmented result is displayed. For example, a portion segmented as a mask is displayed as a white area. Step 105 effects the branching processing to determine whether the segmented result can be stored or not according to the command inputted through the keyboard 404. When it is not to be stored, in step 106, the mask is returned to the state before the discrimination processing is carried out in the step 103 and this mask is displayed. When it is to be stored, in step 107, the segmented result is stored. Concretely speaking, other than the mask for making the display, another mask for storage is secured in the memory and the data is written in it.

In step 108, it is determined depending upon the input through the keyboard 404 whether the processing is continued or not. When the processing is to be continued, the procedure returns to the step 102 and is repeated from the step where the new processing area is set. When the processing is not to be continued, the result is produced to finish the processing.

The discrimination processing of the step 103 will now be described with reference to FIGS. 2 and 3.

FIG. 2 shows a process flow in the case where one representative point and one reference point are specified. That is, in a step 201, a portion on the screen that is to be segmented as a mask is picked to input R, G and B components at the representative point, and in a step 202, an undesired portion that is not a mask is picked to input R, G and B components at the reference point.

This will be concretely described with reference to FIG. 5. A cursor 503 is located in a processing area 502 over a car 501, the position of the cursor 503 is read out to specify the position on the image, and red, green and blue values of the image are inputted.

Figure 5A:
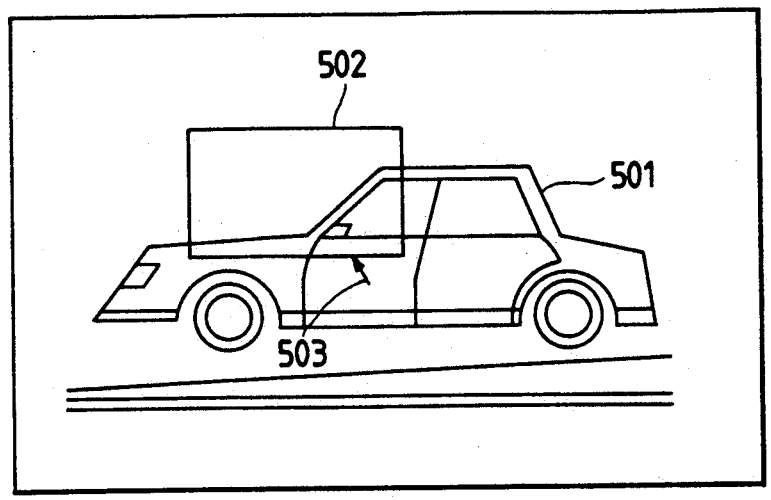
FIGS. 5a and 5b are diagrams showing a portion to be segmented and an unnecessary portion.
Figure 5B:
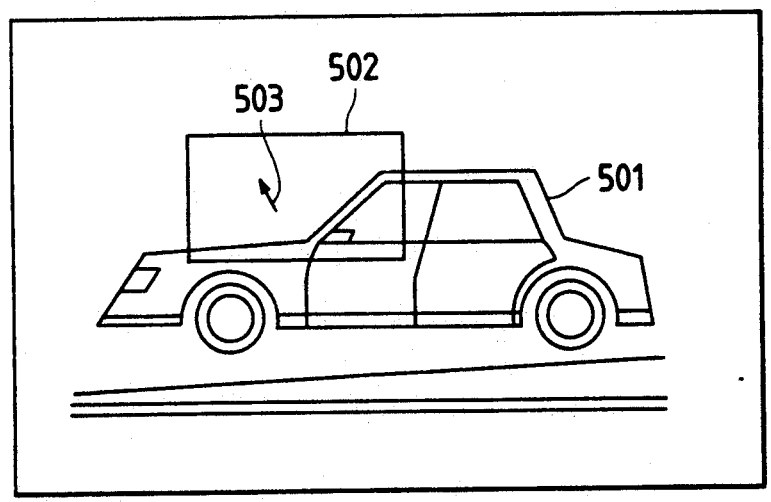

In FIG. 5a, a portion pointed to by the cursor is the portion to be segmented, i.e., the area that is to be separated from other areas in the image, and the color of this area is called a representative color. In FIG. 5b, a portion pointed by the mouse is an undesired portion, i.e., the area that should not serve as the mask in the discrimination processing, and the color of this area is called a reference color. By the processing using this cursor, the position on the screen is simply designated to input the red, green and blue values of the image.

In step 203, a point is specified which is on the line segment connecting these two points and at which the plane passes, so that the plane will serve as a discriminating plane.

Figure 6A:
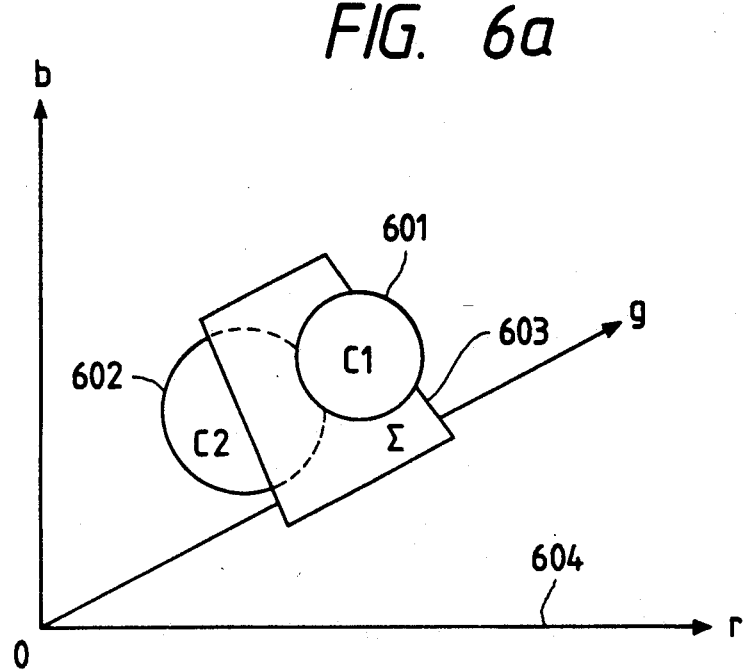
FIGS. 6a and 6b are diagrams showing discriminated surfaces according to the present invention.
Figure 6B:
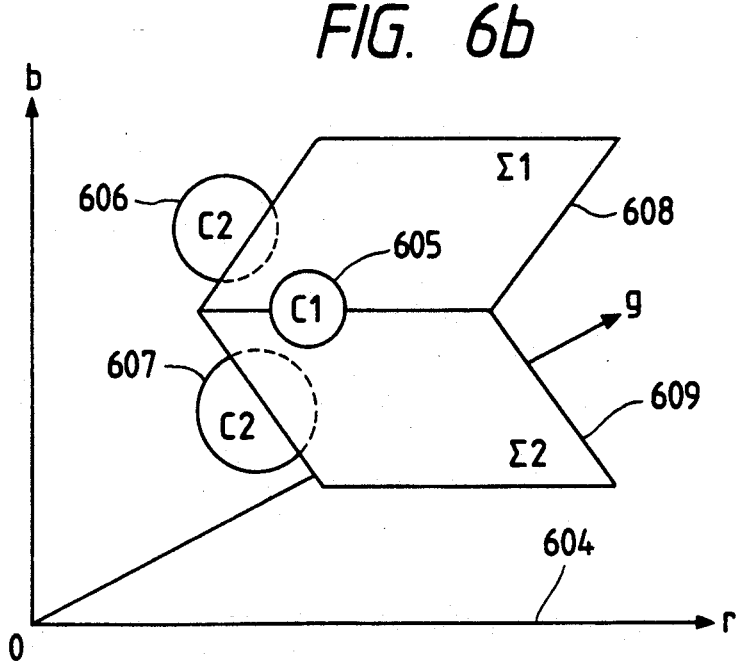

The discriminating plane of the present invention will now be described. With respect to the discrimination in a color space, as shown in FIG. 6a, a plane or a curved surface in any positional direction is used as a condition of discrimination in color space developed along the coordinate axis 604. That is, a discriminating plane 603 is used to discriminate a color distribution 601 from another color distribution 602. It is further possible to discriminate a complex color distribution such as a color distribution 605, a color distribution 606 and a color distribution 607 by using discriminating planes 608 and 609 shown in FIG. 6b instead of using a piece of plane or curved surface.

The steps 201 to 203 will now be described using equations.

Assuming;

A color of representative point: $\vec{P}^l = (Pr^l, Pg^l, Pb^l)$
A color of reference point: $\vec{P}^m = (Pr^m, Pg^m, Pb^m)$
then, the equation of a plane which internally divides the representative point and the reference point at a ratio of $t:1-t$ in the RGB space is expressed as, $$\alpha r + \beta g + \gamma + \delta = 0$$

where, $$\alpha = P_r^m - P_r^l,$$

$$\beta = P_g^m - P_g^l,$$

$$\gamma = P_b^m - P_b^l$$

$$\delta = (t-1)|\vec{P}^l|^2 + (1-2t)\vec{P}^l \cdot \vec{P}^m + t|\vec{P}^m|^2 \quad (3)$$

When a value t is determined in the equation (3), the discriminating plane is completely determined.

The value t is determined by the input through the keyboard 404 or in the following way. FIG. 7b shows a histogram 710 made by projecting the points of color distributions of FIG. 7a onto the line segment that connects a representative color 707 and a reference color 708. For instance, the value t can be so selected that a discriminating plane 709 is located in a position corresponding to a minimum portion 711 of the histogram 710.

The former method is employed, and the discriminating plane is determined by inputting the numerical values through the keyboard. The segmentation result by this plane is displayed in the step 104, and this procedure is repeated until a satisfactory result is obtained.

In step 204, it is judged whether R, G and B values of the pixels in the processing area are on the same side as that of the representative point with respect to the discriminating plane. In step 205, the logical operation is carried out for the areas that overlap the mask by the previous discrimination. The logical operation is carried out to unify the results after a pixel is subjected to discrimination process in a plurality of small areas, the discrimination process being such that the areas serving as a mask are treated as "true" and the areas not serving as a mask are treated as "false".

Figure 8A:
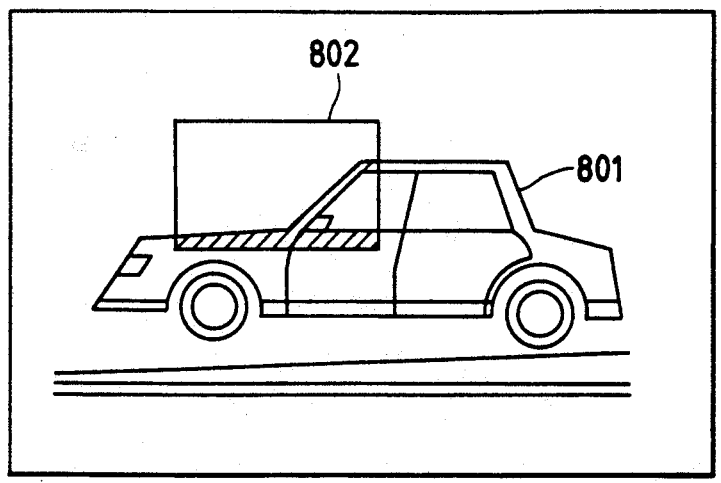
FIGS. 8a, 8b and 8c are diagrams for explaining the logical operation of the processing areas.
Figure 8B:
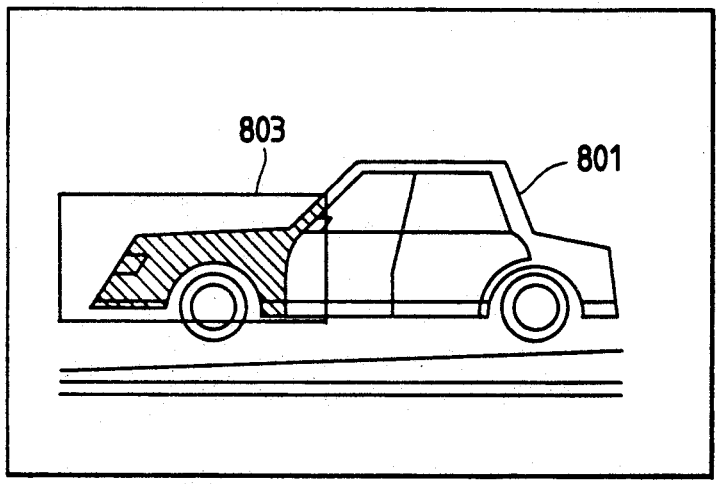
Figure 8C:
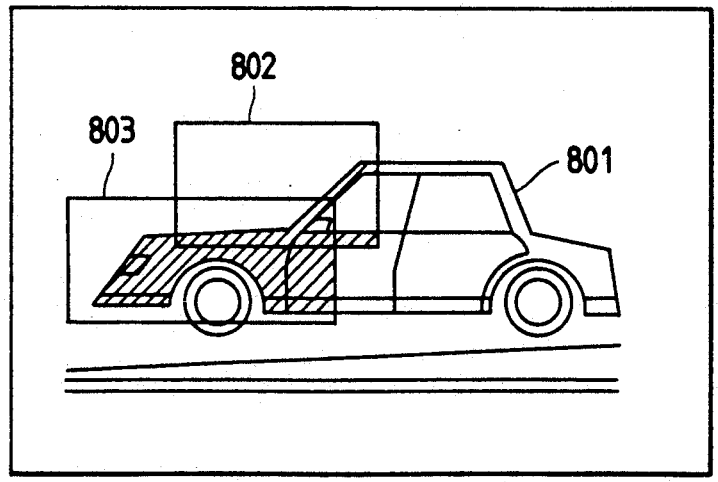

In the embodiment of the present invention a logical product is taken. Concretely speaking, the area is judged to be a mask only when both the results discriminated previously and this time show that the area is a mask. Referring to FIGS. 8a and 8b, for example, the discrimination processing is effected for a processing area 802 and for a processing area 803, respectively, and then the logical operation is carried out as shown in FIG. 8c. Even when a car 801 has the same body color, the color tone delicately changes depending upon a photographed position, etc., and this divisional processing makes it possible to carry out the favorable segmenting processing.

The steps 204 and 205 are repeated for all pixels in the processing areas.

FIG. 3 is a flow chart illustrating in detail the discrimination processing of the step 103 when a plurality of representative points and reference points are specified.

In a step 301, n representative points are inputted by picking. Similarly, in a step 302 m reference points are inputted. Discriminating planes are set for each of these sets of (n×m) representative points and reference points. Parameters t may be determined for each of them. In the embodiment of the present invention, however, t is assumed to be 0.5. This is because a minimum position of the histogram in many cases exists near the intermediate point between the representative point and the reference point, and the segmenting is in many cases carried out successfully.

Assuming that an area of the discriminating plane between a k-th representative point and an (-th reference point on the side of the representative point is denoted by $\Omega_{kl}$, the following area is finally discriminated and segmented, $$\bigcup_{k=1}^{n} \left( \bigcap_{l=1}^{m} \Omega_{kl} \right) \quad (4)$$

In step 304, it is discriminated whether the pixels satisfy the equation (4) or not, and in step 305, the logical operation using the previous result is performed.

Figure 9:
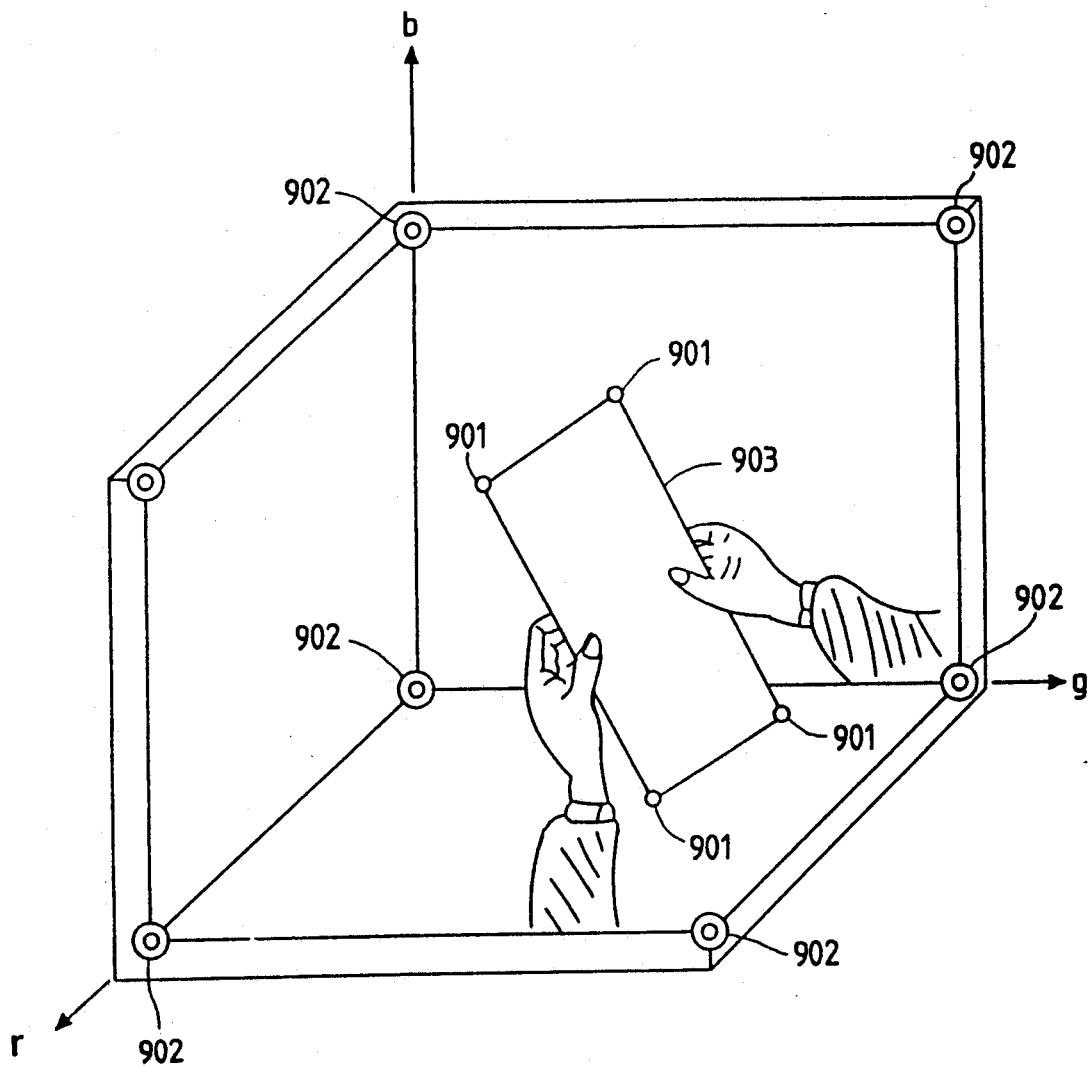
FIG. 9 is a diagram showing a plane position inputting device according to the present invention.

The discrimination processing in step 103 may be carried out by using the device used for directly inputting the plane position shown in FIG. 9.

This device is used for inputting a discriminating plane such as 709 of FIG. 7b, without any programming processes as shown above, but by manipulating a hardware rectangular plane or planar device 903.

This rectangular plane 903 can be moved, turned, or inclined at a user's discretion, and can input itself as a discriminating plane such as 709 which can be moved, turned or inclined in correspondence with the movement of the device.

Figure 7A:
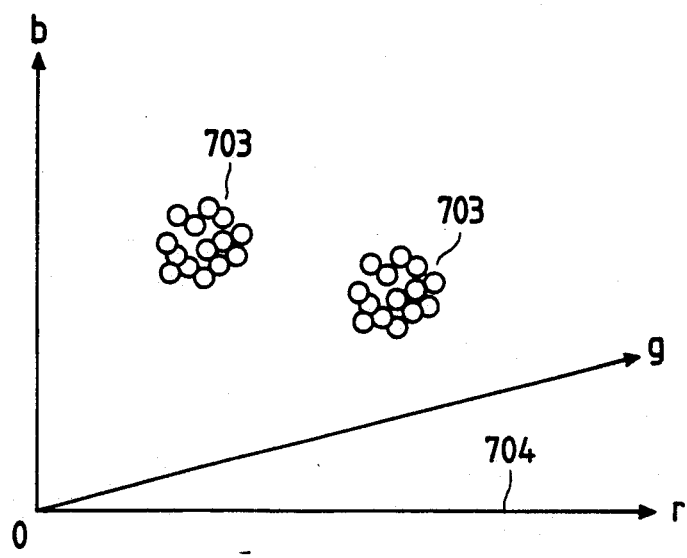
FIGS. 7a and 7b are diagrams illustrating color distributions and histograms.
Figure 7B:
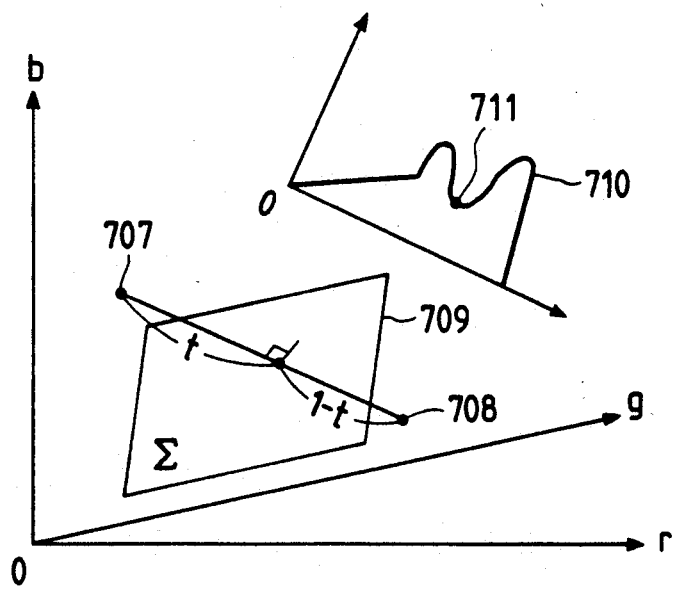

For linking device 903 with discriminating plane 709 of FIG. 7b, the color distribution coordinates r,g,b of FIG. 9 are first calibrated so that they precisely correspond to the r,g,b coordinates of FIG. 7a or 7b respectively, but which may not be displayed ordinarily. After that, by displaying an image as shown in one of FIGS. 8a–8c, one can conform a best discrimination by watching the best pattern of e.g., the hatched part of the car, the pattern of the hatched part being changed in correspondence to the movement of the plane device 903. The specific configuration is as follows.

Pulse transmitters 901 are provided at four corners of the rectangular plane 903, and pulses oscillated therefrom are received by receivers 902. This device can corresponds directly to RGB space and to a plane in this space. For instance, times are measured since a pulse is transmitted from a transmitter until it reaches the receivers and differences in the times are determined to detect the position of the transmitter. That is, the plane 903 is placed in this device to input the position of the plane without the need of inputting numerical data such as parameters like coefficients of the equation of the plane or position coordinates of points included in the plane. This plane is used as a discriminating plane to carry out the discrimination processing.

According to the embodiment of the present invention as described above, the processing area is specified in the step 102 in the loop from the step 102 to the step 107 for every execution of the loop. It is, however, also allowable to decide, at first, a small area used in each loop according to a line of points of position coordinates on the image inputted through the keyboard prior to executing the loop processing.

Furthermore, the discriminating surface used in step 103 can be defined through the following processing. That is, $\vec{P}^l$, $\vec{P}^m$ and t (seven parameters in total consisting of red, green and blue components of each of the reference points and the representative points, and t) that make the following scale J of separation minimum, are retrieved and decided, and a discriminating plane is defined using these values.

$$J = \frac{1}{\text{number of pixels}} \left[ \sum_{\substack{\text{pixels on} \\ \text{the mask}}} (\vec{a}(i,j) - \vec{P}^l)^2 + \sum_{\substack{\text{pixels outside} \\ \text{the mask}}} (\vec{a}(i,j) - \vec{P}^m)^2 \right]$$

According to the means for achieving the first object of the present invention as described in the above first embodiment, a favorable separation and segmentation processing can be carried out even when a particular area is to be separated from the image having complex color distributions.

The second embodiment of the present invention will now be described in conjunction with FIGS. 10 to 17. The diagram of hardware configuration of this embodiment is common to that of the first embodiment, and reference is made to FIG. 4 without, however, using the plane position inputting device 408. This embodiment deals with another means for achieving the second object.

Figure 10:
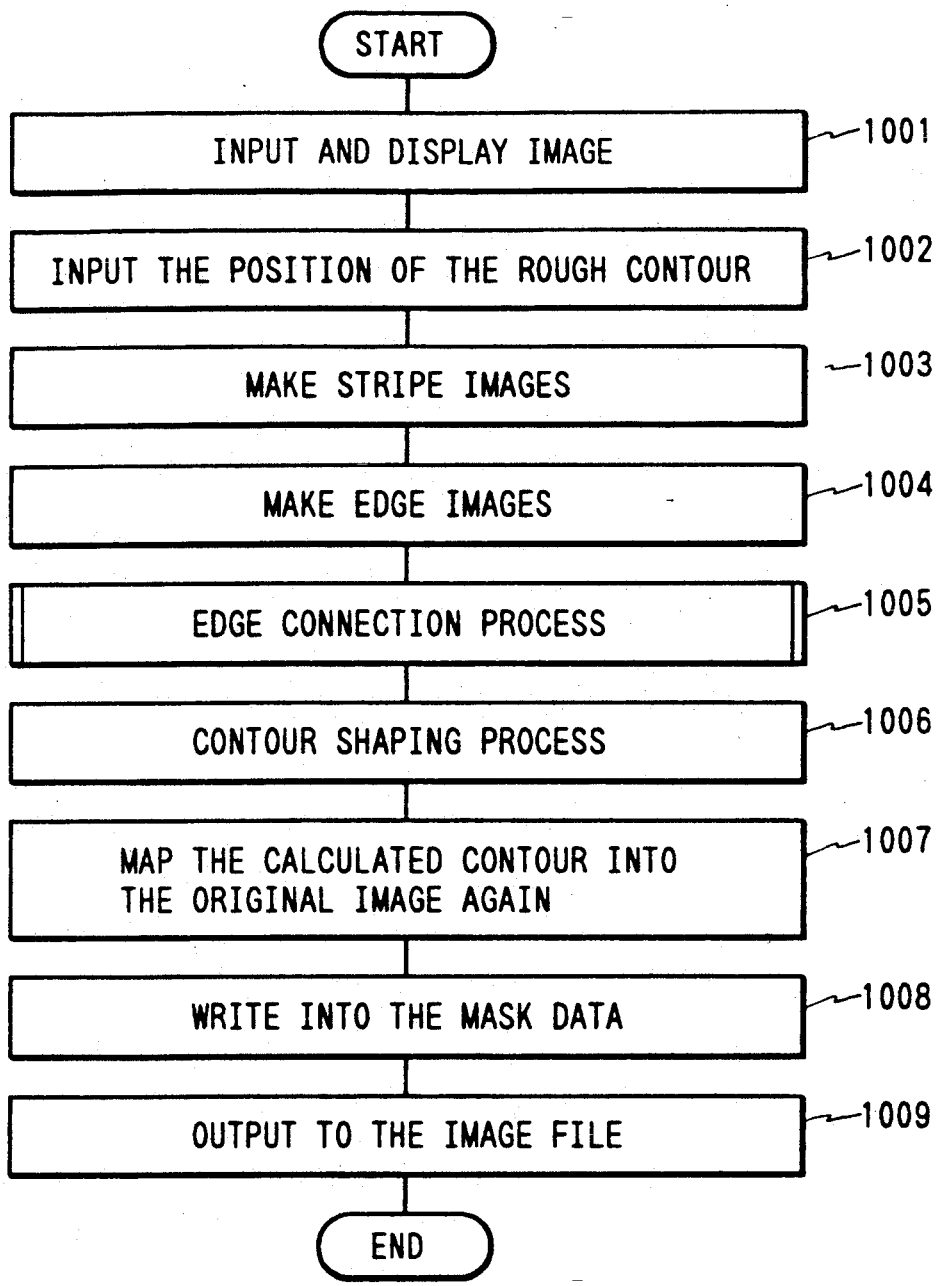
FIG. 10 is a flow chart illustrating the processing of the second embodiment according to the present invention.

FIG. 10 is a flow chart illustrating the processing procedure according to the embodiment of the present invention. FIGS. 11 to 17 are diagrams for explaining the contents of the processing procedure of the embodiment according to the present invention.

Figure 11:
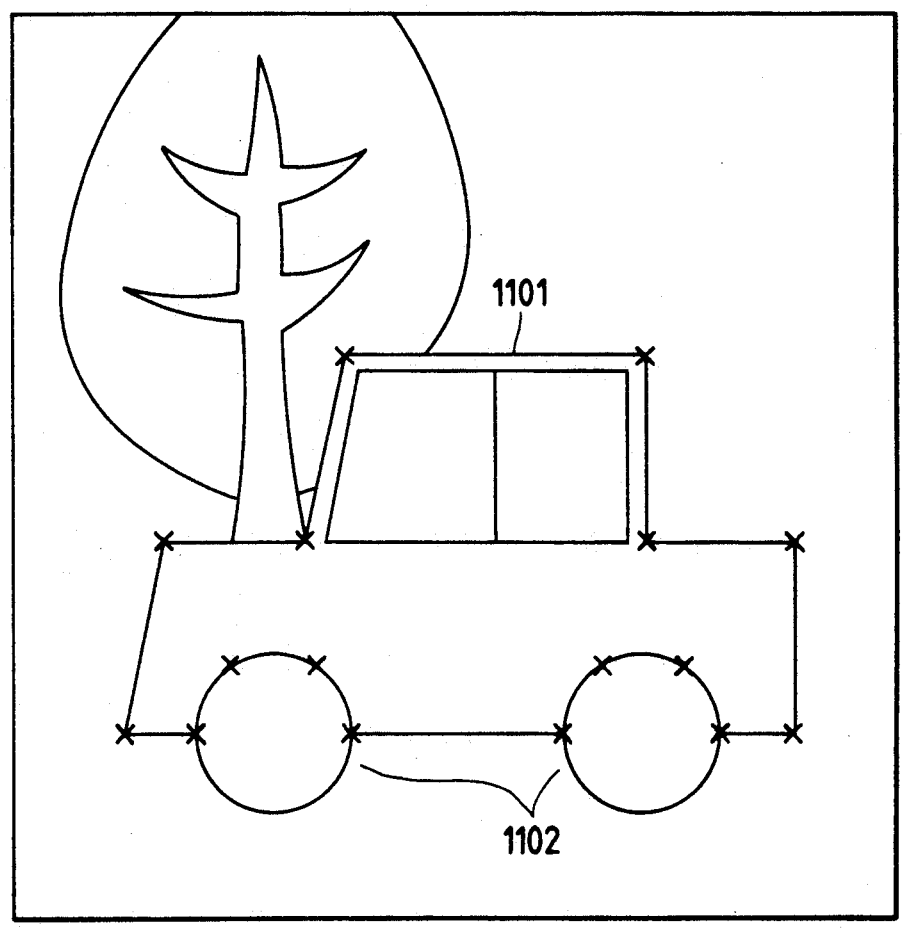
Figure 13:
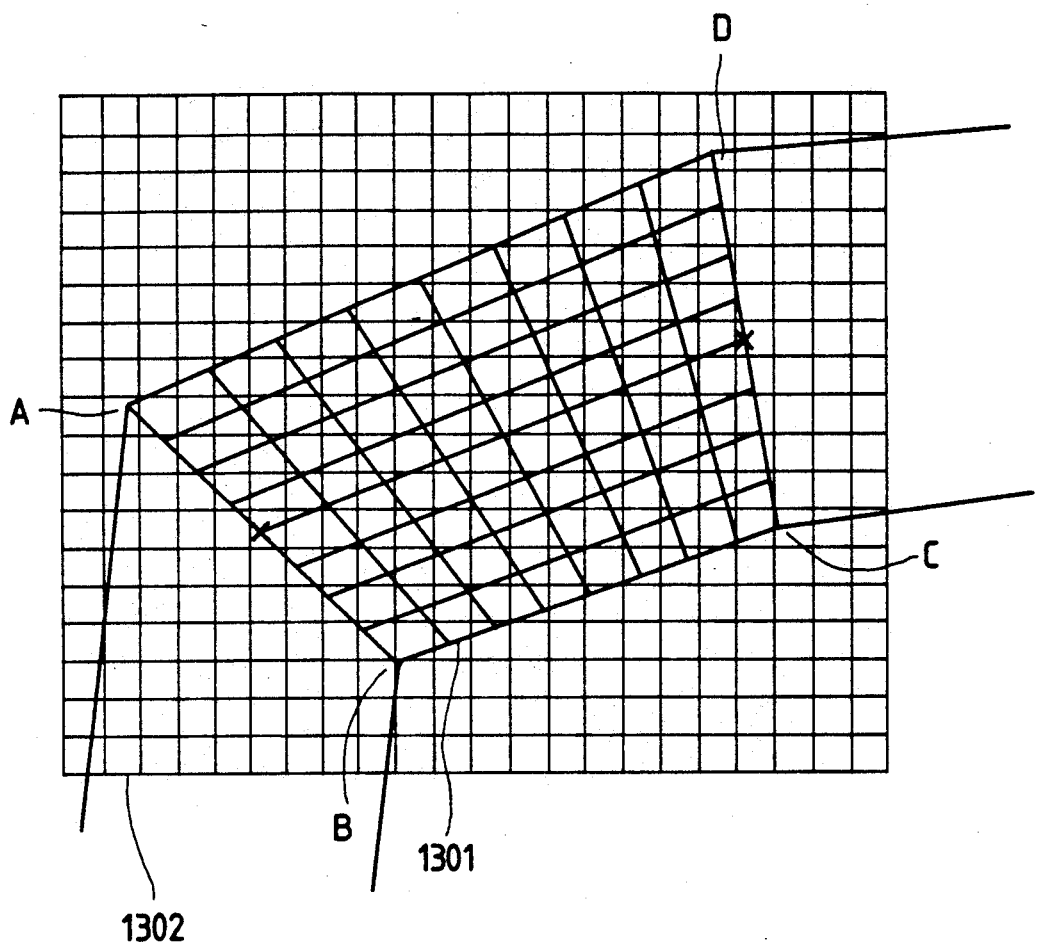
Figure 14:
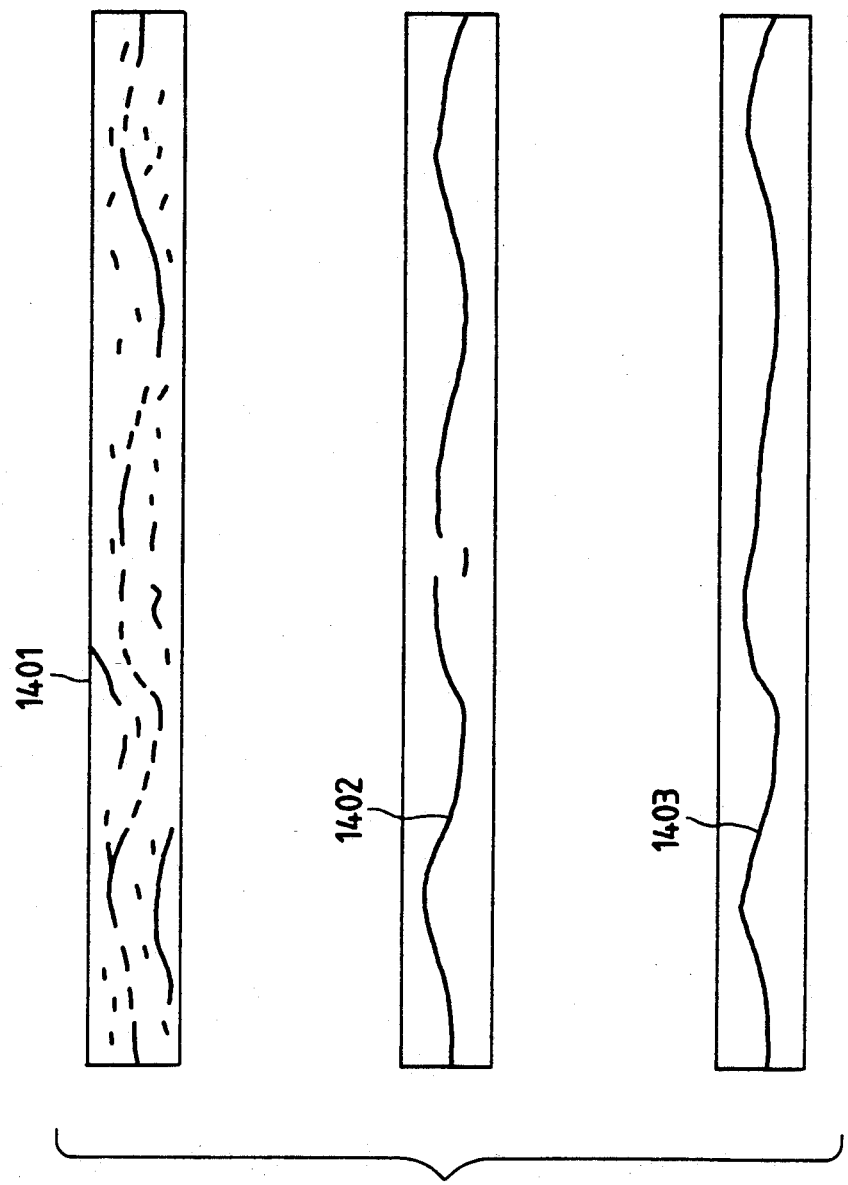
Figure 15A:
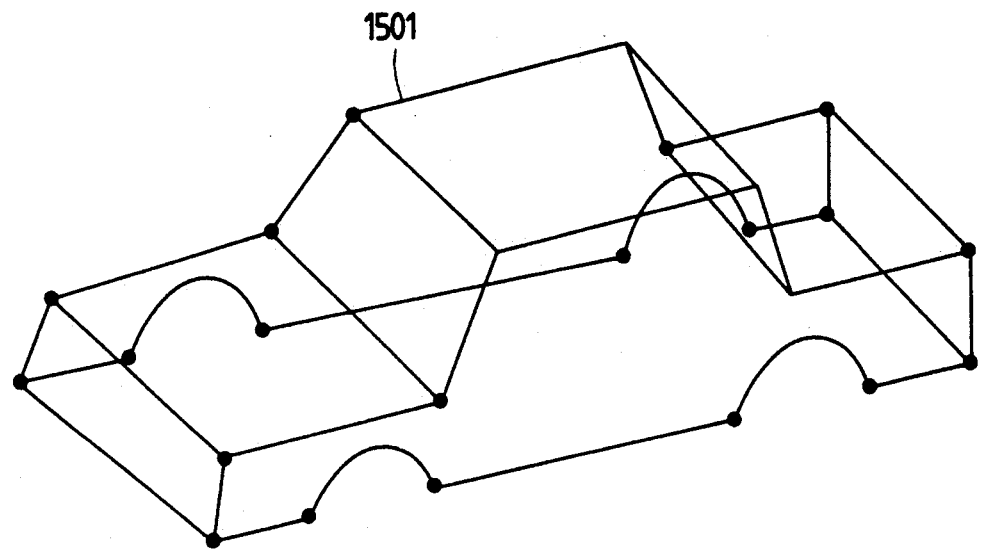
Figure 15B:
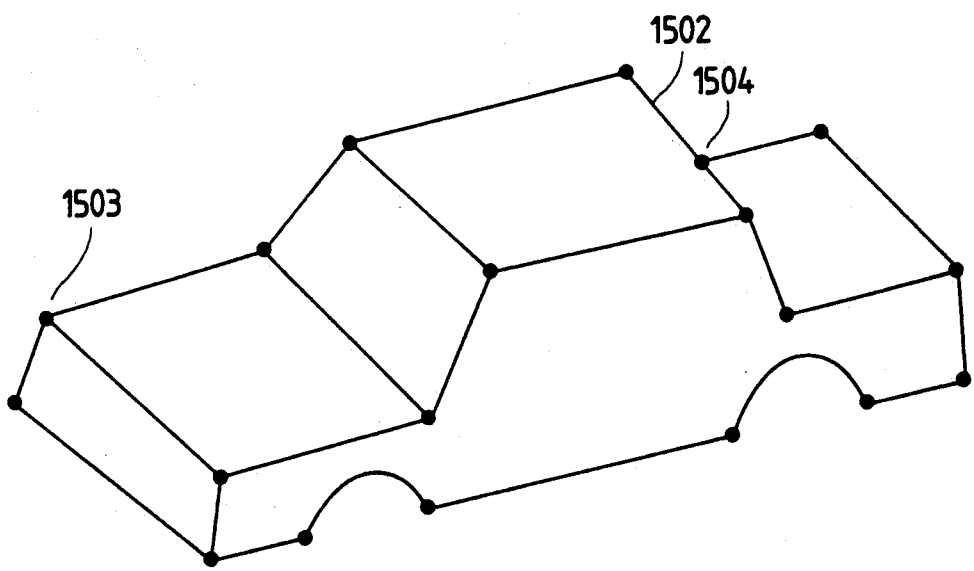
Figure 16A:
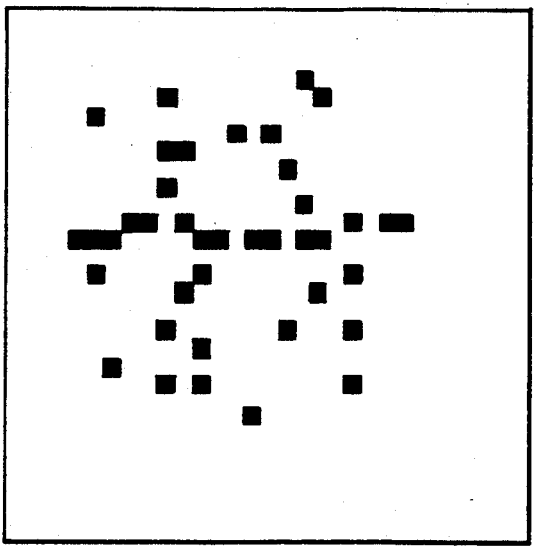
Figure 16B:
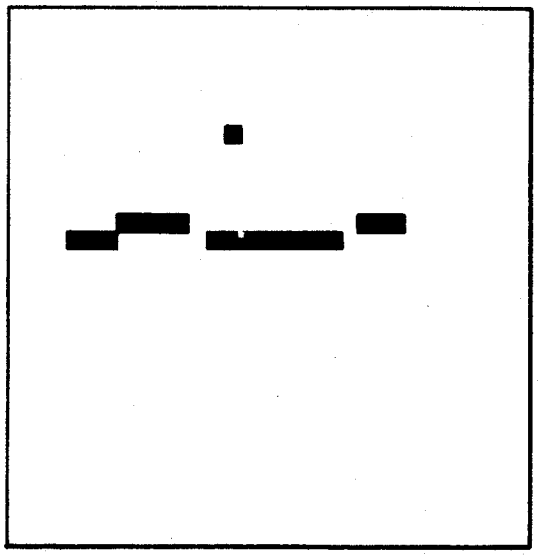
Figure 16C:
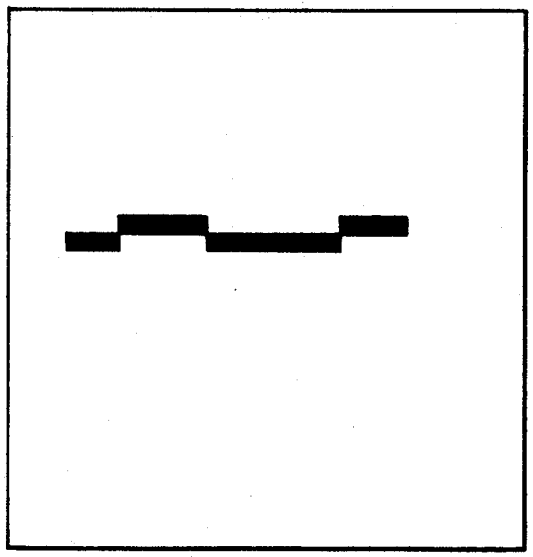
Figure 17:
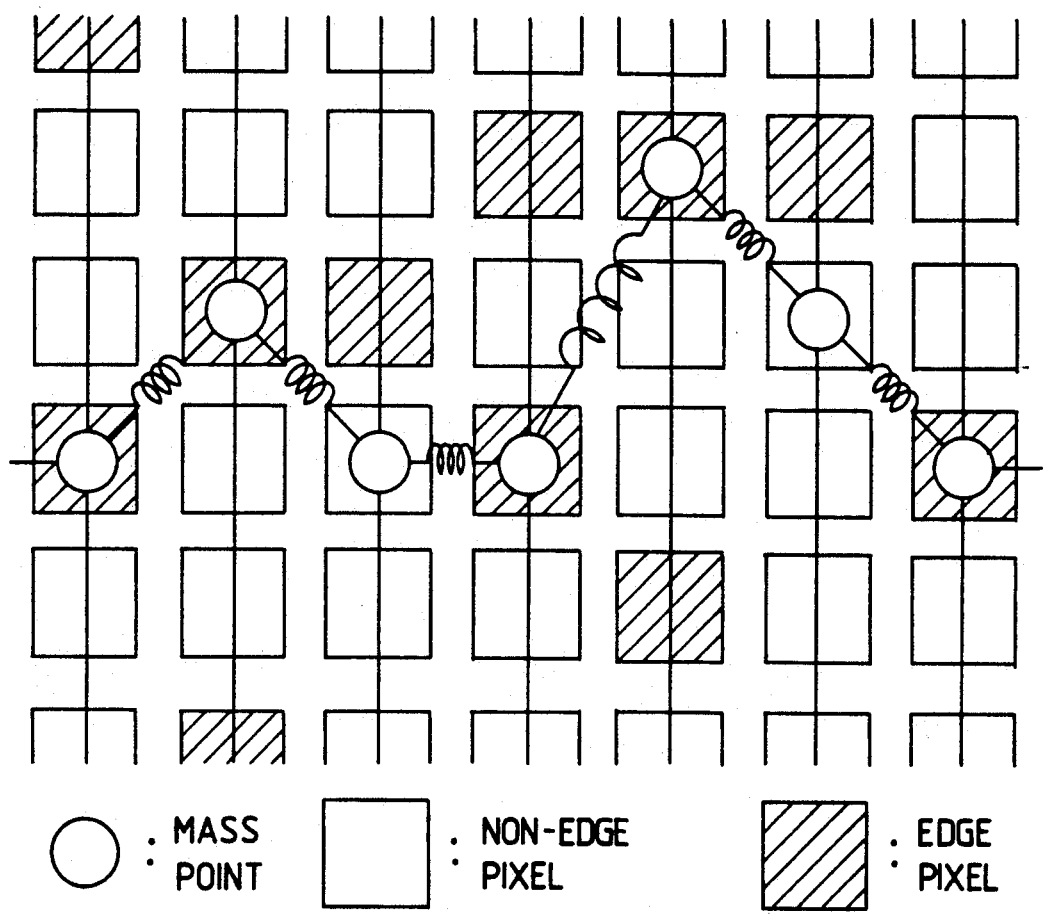

The basic processing procedure of the invention will be described in conjunction with FIG. 10. In step 1001, an image is inputted and displayed. For instance, imagine an image which is made by removing specified points of the rough contour, marked with the marks X, from the image shown in FIG. 11. The purpose of this embodiment is to segment an object 1101 to be segmented, i.e., to segment a portion of the car body from other background portions. In a step 1102, the mouse is operated to specify points 1102 of the rough contour. The number of the points should be such that the rough contour of the object to be segmented can be obtained when they are connected together as shown in FIG. 11, and these points need not be positioned exactly on the contour. In a step 1003, peripheral part of the contour is picked as shown in FIG. 12 so that the part has a width (typically about 20 to 40 pixels, but not limited to this), according to the positions of the rough contour inputted in the step 1002, and are cut apart along the line A—A', followed by the re-sampling processing in order to obtain a stripe image 1202 which is a long rectangular digital image. The re-sampling processing will now be described with reference to FIG. 13. In the re-sampling processing, a trapezoid 1301 is sectionalized into a lattice and the pixel value of the original image at each lattice points is converted into the corresponding pixel value of the stripe image in order to transform the trapezoid ABCD 1301 defined by the rough contour into a rectangular stripe image. Pixel values just thereunder are often used, but in many cases, the peripheral pixel values are used for interpolation. In step 1103, an edge image on the stripe image 1202 by the method mentioned in the chapter where the prior art was described. This embodiment uses the zero crossing. As the result, an edge image 1401 in FIG. 14 is obtained. A true contour must run in the lateral direction in the edge image 1401, and this is done by the edge connection processing of a step 1005. The content thereof has been described already in the chapter of the operation. This embodiment employs the method of Hopfield network. A contour (before shaping) 1402 is obtained as the result of the edge connection processing. A perfect result may not be obtained by the edge shaping processing alone. Therefore, in step 1006 the contour shaping processing is effected. The object is to remove isolated leap that may exist in the contour (before shaping). In the processing of this embodiment, the contour (before shaping) is searched from one end. When a short line segment sandwiched between discrete points is detected, the line segment is eliminated and the ends on the both sides are connected. As a result, a contour (after shaping) 1403 is obtained. When a perfect result is obtained (when no leap is detected) through only the edge connection processing of the step 1005, the contour shaping processing of the step 1006 is not carried out. In step 1007, the contour (after shaping) is again mapped onto the original image by application of a conversion opposite to that by which the stripe image 1202 is made from the peripheral part 1201 of the contour shown in FIG. 12. In step 1008, a mask image overlapping the original image is formed, the mask image having the same size as that of the original image and used for distinguishing the inside of the contour from the outside thereof. Typically, 0 is assigned to the position of pixels outside the contour, and 1 is assigned to positions on the contour and the inside thereof. It can be held separately from the original image, but it may be held in the same image file. That is, many full color graphic workstations utilize the fact that one pixel is formed from 32 bits. To use 256 tones for each of red, blue and green colors, each of them needs have eight bits. In order to display 16,700,000 colors, therefore, each pixel needs 24 bits. From the standpoint of the processing, however, the pixel in may cases has eight additional redundancy bits. When the mask image is stored in the redundancy bits, it is allowed to add information of object to be segmented without increasing the storage capacity of the image. In step 1008, the image with mask information is stored in the memory 403 of FIG. 4. The image file with mask information can be used in application programs for image simulation. For example, when a car body is to overlap another background image for image synthesis, the image should be so formed that the pixels where masks are 0 have pixel values of background image and the pixels where masks are 1 have pixel values of the overlapped image (car). In the color changing processing, furthermore, the algorithm of processes for changing colors is adapted to only those pixels where the masks are 1, thereby to change the colors of the car body portion only.

The following substitutional processings can be carried out in the steps of the aforementioned second embodiment.

In step 1002, several positions of the rough contour are discretely picked and inputted through the mouse. Instead of this, however, it is also allowable to continuously run the mouse along near the contour in order to use the locus thereof. Several positions of the rough contour should be set on the locus. These positions may be arranged on the locus at regular intervals or may be arranged on portions having large curvatures. A stripe image can further be obtained by expanding or contracting a continuous locus of mouse.

When there is previously made a model of a typical shape for the car body, in step 1002, this model is used as a rough shape that includes the contour. A three-dimensional shape model 1501 of FIG. 15 consists of three dimensional shape data from which a two dimensional shape model 1502 can be formed by perspective transformation when the position of a point of view is defined. The two-dimensional shape model is the one in which hidden lines are eliminated, and expresses a rough shape which is made when the image formed with the car body viewed from a specified point of view is turned into a line drawing, and comprises segments, curves, nodes 1503 and crossing points 1504. If the nodes and crossing points of the two dimensional shape model are made to positionally correspond to the image, the line segments and curves form a rough shape of the car body in the object image. Hereinafter, the processings in the steps are similarly carried out by independently forming the stripe images for each of the line segments and curves.

In forming the edge image in step 1004, it is possible to execute differentiation of first order instead of the zero crossing as mentioned in the chapter of the prior art.

In the edge connection processing in step 1005, simulated annealing may be used instead of Hopfield network.

In writing the data onto the mask data in step 1008, it is allowable to write a plurality of masks (e.g., the car body and tires can be held as separate masks) as different integers smaller than 256.

Figure 18:
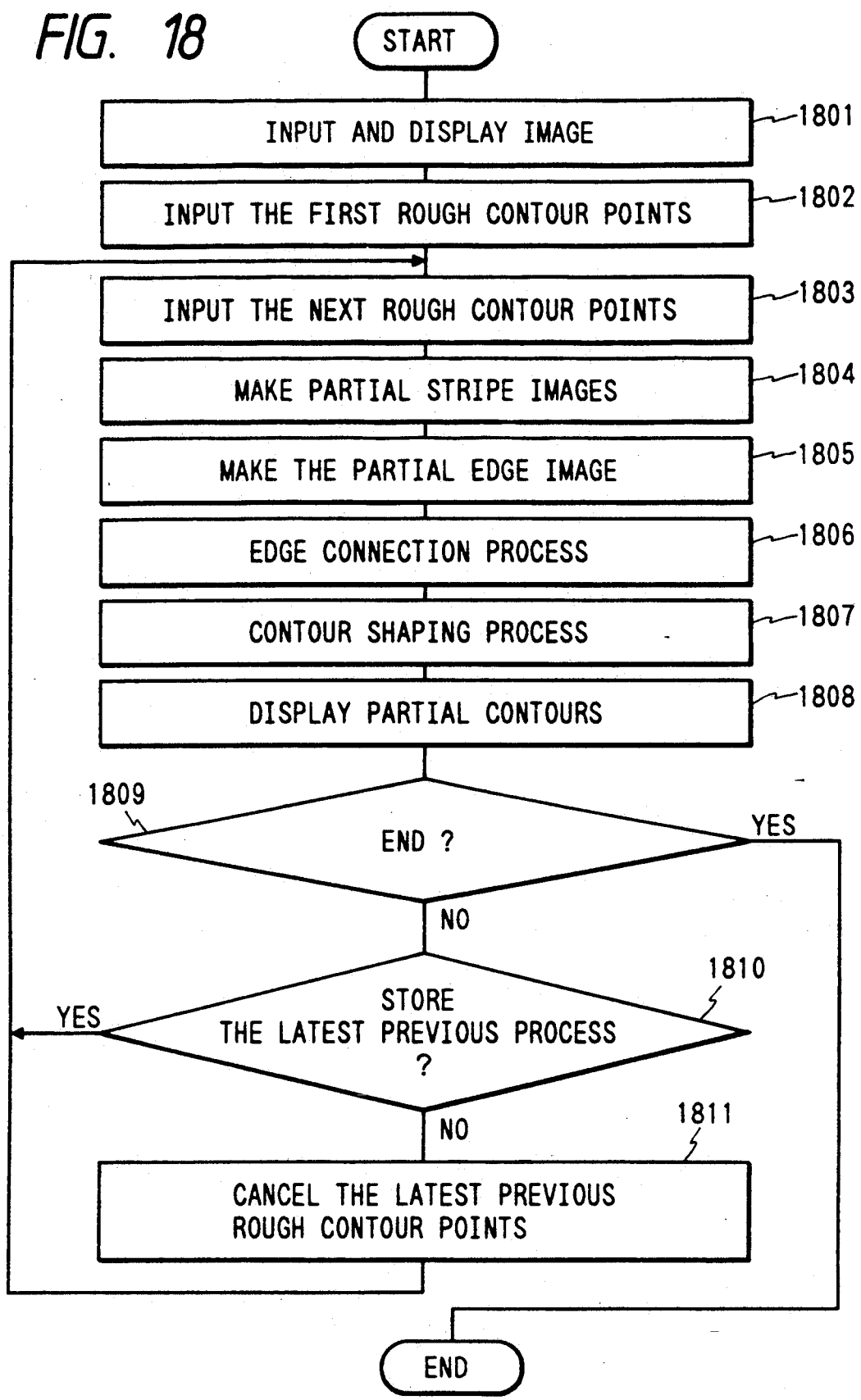
FIG. 18 is a flow chart illustrating the processing of the third embodiment according to the present invention.
Figure 19:
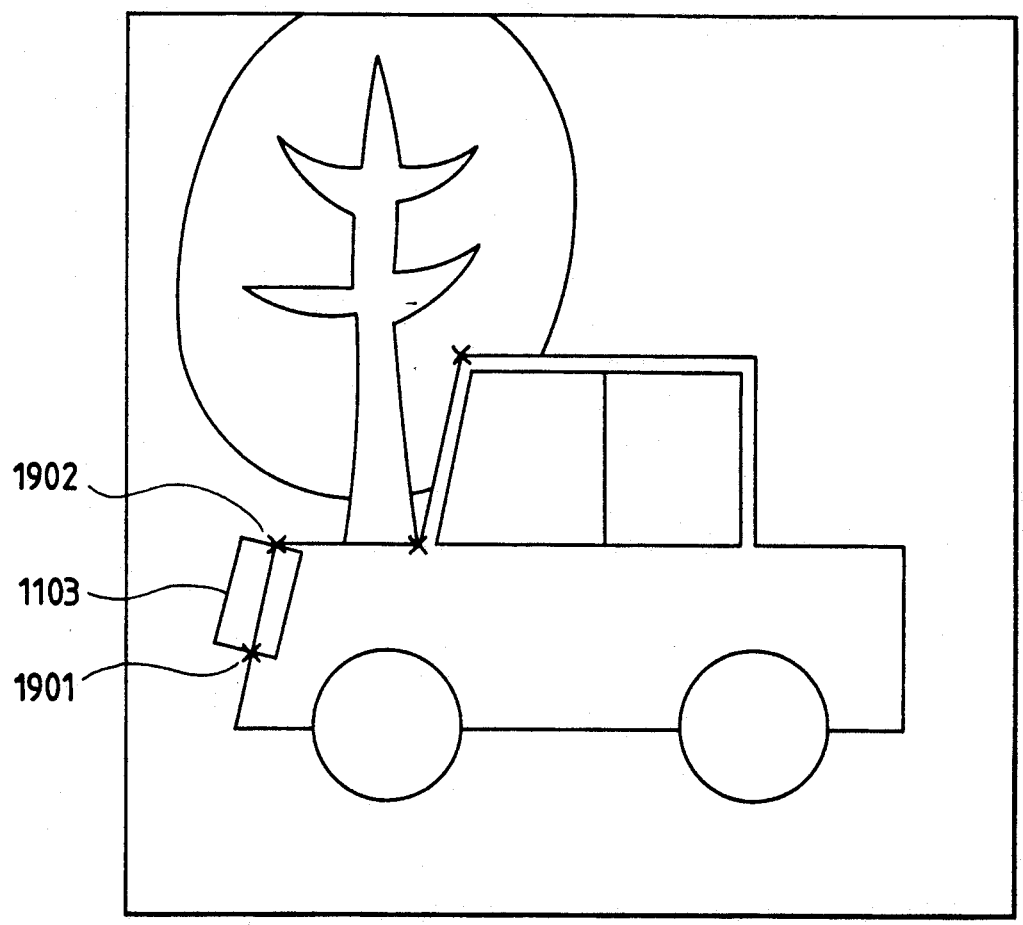
Figure 20A:
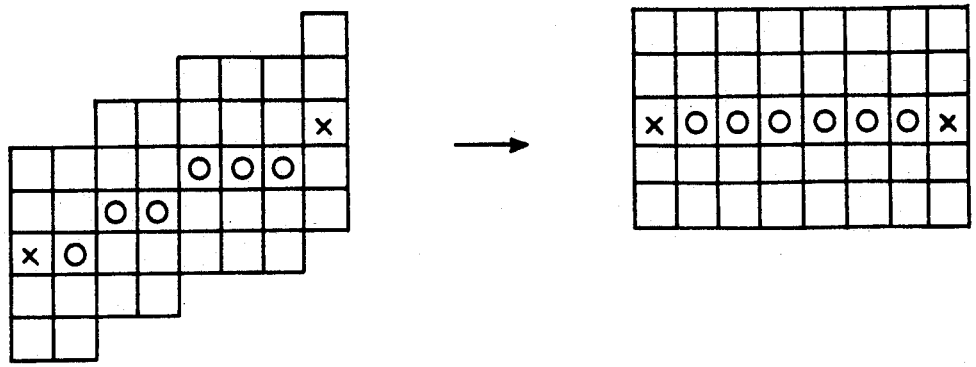
Figure 20B:
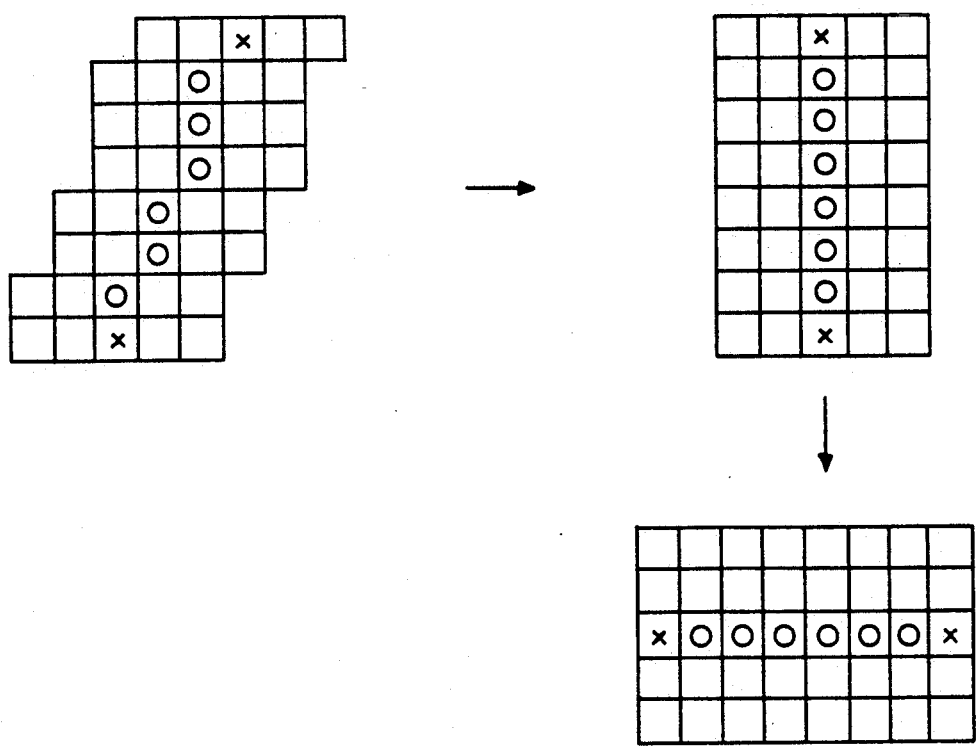

Next, a third embodiment of the present invention will be described in conjunction with FIGS. 18 to 20. This embodiment has the same object as the second embodiment. The steps of FIG. 20 correspond to steps 1001 to 1007 of FIG. 10. This embodiment is different from the second embodiment with regard to that the rough contour positions are not all specified to effect the edge connection processing unlike the second embodiment, but a partial stripe image is formed every time a point is specified and the edge connection processing is separately carried out in it.

In step 1801, an image of the object to be segmented is inputted and displayed. In step 1802, the position of a first rough contour point is inputted by picking. Steps 1803 and the subsequent steps form a loop. In step 1803, the position of the next rough contour point is inputted by picking. In step 1804, a stripe image is formed by using a rough contour point 1901 which is shown in FIG. 19 and inputted in step 1803 and a rough contour point 1902 inputted previously, the stripe image being formed along the line that connects these rough contour points. Steps 1805 to 1807 are the same as the steps 1004 to 1006 of the second embodiment except that the object to be processed is a partial stripe image. In step 1808, the contour made by calculation with respect to the partial stripe image is superposed on the original image so as to be displayed. Step 1809 is a branching whether or not the whole contour is extracted and the processing is to terminate. When the processing is not terminated, the procedure proceeds to step 1810 where the branching processing is effected in regard to whether or not the result of contour extraction of the partial stripe image effected previously in step 1808 is to be stored. When it is not to be stored, the rough contour point specified just before and the partial contour are cancelled, and the procedure returns to step 1803. When the result is to be stored, the procedure returns directly to step 1803. Subsequent to the steps of this embodiment, the mask image is formed and is written in the image file as in the second embodiment so as to be applied to image simulation.

In the aforementioned steps of the third embodiment, the following substitute processings can be carried out.

In step 1804, the method of re-sampling the partial stripe image can be simplified. When the directions of the line segments formed by the rough contour points are close to the lateral direction, such segments are rearranged in a rectangular form as shown in FIG. 20(*a*). When those of the rough contour points are close to the vertical direction, such points are rearranged in a form as shown in FIG. 20(*b*). In this processing, the points are simply rearranged without accompanying interpolation.

In the second and third embodiments according to the invention, only the positions of the contour of the object to be segmented are specified, and the detailed contour is obtained.

According to the present invention as described above, information concerning the object to be segmented that is inputted from the external unit or concerning the boundary thereof, and the segmenting process is carried out. The present invention can be adapted to even cases where the color distribution is complex and where the object and the background have colors of the same kind, that could not be carried out so far.

What is claimed is:

1. In an image processing apparatus for processing a color or a monochromatic density image that is digitally expressed, an image segmentation method that segments a particular object out of the image comprising:
   a step of inputting information that contains at least one parameter of a position and an attribute of at least one of a region of the image to be segmented and of a region not to be segmented;
   a step of decomposing the processing area in the image into a plurality of small areas that are allowed to overlap each other based upon said inputted information;
   a step of setting color information to at least a pixel in said at least one region containing said at least one parameter; and
   a step of deciding a discriminating boundary of pixels in said region to be segmented and pixels in said region not to be segmented, on the basis of said color information, wherein said step of setting color information sets color information to at least a pixel (representative point) of said region to be segmented and at least a pixel (reference point) of said region not to be segmented, further comprising:
   a step of setting according to said color information one of a planar and a curved surface intersecting the line segment connecting said representative point and said reference point at right angles as a discriminating surface; and
   said deciding step discriminating said boundary on the basis of said discriminating surface.

2. An image segmentation method according to claim 1, wherein said discriminating surface is a surface that internally divide said line segment at a ratio of $t:1-t$, wherein said t is an arbitrary member of $0 \leq t \leq 1$.

3. An image segmentation method according to claim 2, wherein said value t is such that said discriminating surface is located in a position corresponding to a minimum portion in the histogram of the color information.

4. An image segmentation method according to claim 3, wherein said value t is 0.5.

5. An image segmentation method according to claim 1, wherein when there are a plurality of said representative points and a plurality of said reference points, a logical product of discrimination results of a representative point and the plurality of reference points are obtained and then a logical sum of the results for every representative point are obtained.

6. In an image processing apparatus for processing a color or a monochromatic density image that is digitally expressed an image segmentation method, that segments a particular object out of the image, comprising:
   a step of inputting information that contains at least one parameter of a position and an attribute of at least one of a region of the image to be segmented and of a region not to be segmented;
   a step of decomposing the processing area in the image into a plurality of small areas that are allowed to overlap each other based upon said inputted information;
   a step of setting color information to at least a pixel in said at least one region containing said at least one parameter; and
   a step of deciding a discriminating boundary of pixels in said region to be segmented and pixels in said region not to be segmented, on the basis of said color information, wherein a logical operation is carried out for overlapping parts of said small areas to unify them, in order to generate a region to be segmented.

7. An image processing apparatus for segmenting a particular object out of a digitally expressed color image, comprising:
   a planar apparatus having data output means for inputting a color discriminating plane corresponding to said planar apparatus itself, as three dimensional data;
   means for setting color information to at least a pixel in a region to be segmented, and to at least a pixel in a region not to be segmented; and,
   means for discriminating said region to be segmented from said region not to be segmented based on said inputted discriminating plane and said color information set to the pixels, wherein said planar apparatus comprises:
   a plurality of pulse transmitters provided on said planar apparatus itself;
   a plurality of receivers for receiving pulses transmitted from at least one of said pulse transmitters;
   means for measuring a time of transmission from a transmitter to a receiver in said plurality of pulse transmitters and receivers; and
   a measuring device for measuring the position of said discriminating plane, according to the measured transmission time.

* * * * *